(12) United States Patent
Lyu et al.

(10) Patent No.: US 12,035,335 B2
(45) Date of Patent: Jul. 9, 2024

(54) SIDELINK COMMUNICATION METHOD AND APPARATUS

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: QUECTEL WIRELESS SOLUTIONS CO., LTD., Shanghai (CN)

( * ) Notice: Subject to any disclaimer, the term of this patent is extended or adjusted under 35 U.S.C. 154(b) by 0 days.

(21) Appl. No.: 18/516,764

(22) Filed: Nov. 21, 2023

(65) Prior Publication Data

US 2024/0090002 A1 Mar. 14, 2024

Related U.S. Application Data

(63) Continuation of application No. 18/307,640, filed on Apr. 26, 2023, which is a continuation of application No. PCT/CN2022/116974, filed on Sep. 5, 2022.

(30) Foreign Application Priority Data

Aug. 18, 2022 (CN) .......................... 202210993192.5

(51) Int. Cl.
*H04W 72/40* (2023.01)
*H04W 72/02* (2009.01)
(Continued)

(52) U.S. Cl.
CPC ........... *H04W 72/40* (2023.01); *H04W 72/02* (2013.01); *H04W 72/0446* (2013.01); *H04W 76/14* (2018.02)

(58) Field of Classification Search
CPC . H04W 72/02; H04W 72/0446; H04W 92/14; H04W 72/40; H04W 76/14
See application file for complete search history.

(56) References Cited

U.S. PATENT DOCUMENTS

| | | | |
|---|---|---|---|
| 11,611,991 B2* | 3/2023 | Xue | ..................... H04W 72/044 |
| 11,751,251 B2* | 9/2023 | Li | ..................... H04W 74/0808 |
| | | | 370/329 |

(Continued)

FOREIGN PATENT DOCUMENTS

| | | |
|---|---|---|
| CN | 111954181 | 11/2020 |
| CN | 112154698 | 12/2020 |

(Continued)

OTHER PUBLICATIONS

3GPP TR 38.889 V1.1.0 (Dec. 2018), "3rd Generation Partnership Project; Technical Specification Group Radio Access Network; Study on NR-based Access to Unlicensed Spectrum; (Release 16)," Dec. 2018, 119 pages.

(Continued)

*Primary Examiner* — Raj Jain
(74) *Attorney, Agent, or Firm* — Fish & Richardson P.C.

(57) ABSTRACT

The present application provides a sidelink communication method and apparatus. The method includes: performing, by a terminal device, channel monitoring on shared spectrum; and if the result of the channel monitoring is that a channel is idle, starting, by the terminal device, transmission of a first sidelink channel at a first time domain position, where the first time domain position is one or more of the following: a time domain position indicated by first indication information; and a time domain position determined based on a first time unit, the first time unit being smaller than one slot.

6 Claims, 6 Drawing Sheets

(51) Int. Cl.
  *H04W 72/0446* (2023.01)
  *H04W 76/14* (2018.01)

(56) References Cited

U.S. PATENT DOCUMENTS

| | | | | |
|---|---|---|---|---|
| 2020/0015214 | A1* | 1/2020 | Si | H04L 25/03866 |
| 2021/0068187 | A1* | 3/2021 | Baghel | H04W 76/19 |
| 2021/0100046 | A1* | 4/2021 | Nguyen | H04L 47/30 |
| 2021/0136783 | A1* | 5/2021 | Fakoorian | H04W 76/14 |
| 2022/0070918 | A1 | 3/2022 | Fan et al. | |
| 2022/0191916 | A1* | 6/2022 | Talarico | H04L 1/1614 |
| 2022/0338174 | A1* | 10/2022 | Zhao | H04L 5/0055 |
| 2023/0066942 | A1* | 3/2023 | Liu | H04W 72/56 |
| 2023/0084780 | A1* | 3/2023 | Wu | H04W 74/0816 370/329 |
| 2023/0111152 | A1* | 4/2023 | Liu | H04L 5/0091 370/330 |

FOREIGN PATENT DOCUMENTS

| | | |
|---|---|---|
| CN | 112437488 | 3/2021 |
| CN | 113645643 | 11/2021 |
| CN | 113812194 | 12/2021 |
| CN | 114245464 | 3/2022 |
| CN | 114616907 | 6/2022 |
| CN | 111800887 | 10/2022 |
| KR | 10-2021-0153837 | 12/2021 |
| WO | WO 2021032027 | 2/2021 |
| WO | WO 2021262577 | 12/2021 |
| WO | WO 2022147700 | 7/2022 |

OTHER PUBLICATIONS

Office Action in Chinese Appln. No. 202210993192.5, dated Oct. 21, 2022, 4 pages (with English Translation).
Office Action in Chinese Appln. No. 202210993192.5, dated Sep. 27, 2022, 14 pages (with English Translation).
Qualcomm Incorporated, "Contribution summary of channel access mechanism for 52.6GHz-71GHz band, ver01," R1-2105986, 3GPP TSG RAN WG1 Meeting #104bis-e, May 10-May 27, 2021, 77 pages.
International Search Report and Written Opinion in International Appln. No. PCT/CN2022/116974, mailed on May 12, 2023, 14 pages (with partial English translation).

* cited by examiner

SIDELINK COMMUNICATION METHOD AND APPARATUS

CROSS-REFERENCE TO RELATED APPLICATIONS

This application is a continuation of U.S. patent application Ser. No. 18/307,640, filed on Apr. 26, 2023, which is a continuation application of International Application No. PCT/CN2022/116974, filed on Sep. 5, 2022, which claims priority to Chinese Patent Application No. 202210993192.5, filed on Aug. 18, 2022. All of the afore-mentioned patent applications are hereby incorporated by reference in their entireties.

TECHNICAL FIELD

The present application relates to the technical field of communications, and more specifically, to a sidelink communication method and apparatus.

BACKGROUND

During sidelink communication on shared spectrum, a terminal device performs channel monitoring through a mechanism such as listen before talk (LBT). When the channel monitoring is successful, the terminal device obtains a channel resource and performs a sidelink transmission at a channel access position. In the related art, a channel access process of the terminal device causes waste of channel resources.

SUMMARY

The present application provides a sidelink communication method and apparatus, which helps to reduce waste of resources of sidelink communication.

According to a first aspect, a sidelink communication method is provided, the method including: performing, by a terminal device, channel monitoring on shared spectrum; and if the result of the channel monitoring is that a channel is idle, starting, by the terminal device, transmission of a first sidelink channel at a first time domain position, where the first time domain position is one or more of the following: a time domain position indicated by first indication information; and a time domain position determined based on a first time unit, the first time unit being smaller than one slot.

According to a second aspect, a sidelink communication method is provided, the method including: performing, by a terminal device, channel access on a first resource of shared spectrum, where the first resource is associated with a second resource in a resource pool; and transmitting, by the terminal device, a first sidelink channel on the second resource.

According to a third aspect, a sidelink communication apparatus is provided, the apparatus being a terminal device and including: a monitoring unit configured to perform channel monitoring on shared spectrum; and a transmission unit configured to: if the result of the channel monitoring is that a channel is idle, start transmission of a first sidelink channel at a first time domain position, where the first time domain position is one or more of the following: a time domain position indicated by first indication information; and a time domain position determined based on a first time unit, the first time unit being smaller than one slot.

According to a fourth aspect, a sidelink communication apparatus is provided, the apparatus being a terminal device and including: an access unit configured to perform channel access on a first resource of shared spectrum, where the first resource is associated with a second resource in a resource pool; and a transmission unit configured to transmit a first sidelink channel on the second resource.

According to a fifth aspect, a communication apparatus is provided, the apparatus including a memory and a processor, where the memory is configured to store a program, and the processor is configured to call the program in the memory to perform the method according to the first aspect.

According to a sixth aspect, an apparatus is provided, the apparatus including a processor configured to call a program from a memory to perform the method according to the first aspect.

According to a seventh aspect, a chip is provided, the chip including a processor configured to call a program from a memory to cause a device installed with the chip to perform the method according to the first aspect.

According to an eighth aspect, a computer-readable storage medium is provided, the computer-readable storage medium storing a program that causes a computer to perform the method according to the first aspect.

According to a ninth aspect, a computer program product is provided, the computer program product including a program that causes a computer to perform the method according to the first aspect.

According to a tenth aspect, a computer program is provided, where the computer program causes a computer to perform the method according to the first aspect.

In the embodiments of the present application, after the terminal device successfully performs the channel monitoring, the first time domain position for the terminal device to perform sidelink transmission is specified, or the first time domain position is determined based on a time unit smaller than a slot. It can be seen that after the successful monitoring, the terminal device does not need to wait for the next slot to perform sidelink transmission, thereby helping to reduce waste of channel resources.

DETAILED DESCRIPTION OF THE EMBODIMENTS

The technical solutions in the present application are described below with reference to the accompanying drawings. For ease of understanding, the terms and communication processes involved in the present application are first described below with reference to FIG. 1 to FIG. 5.

Figure 1:
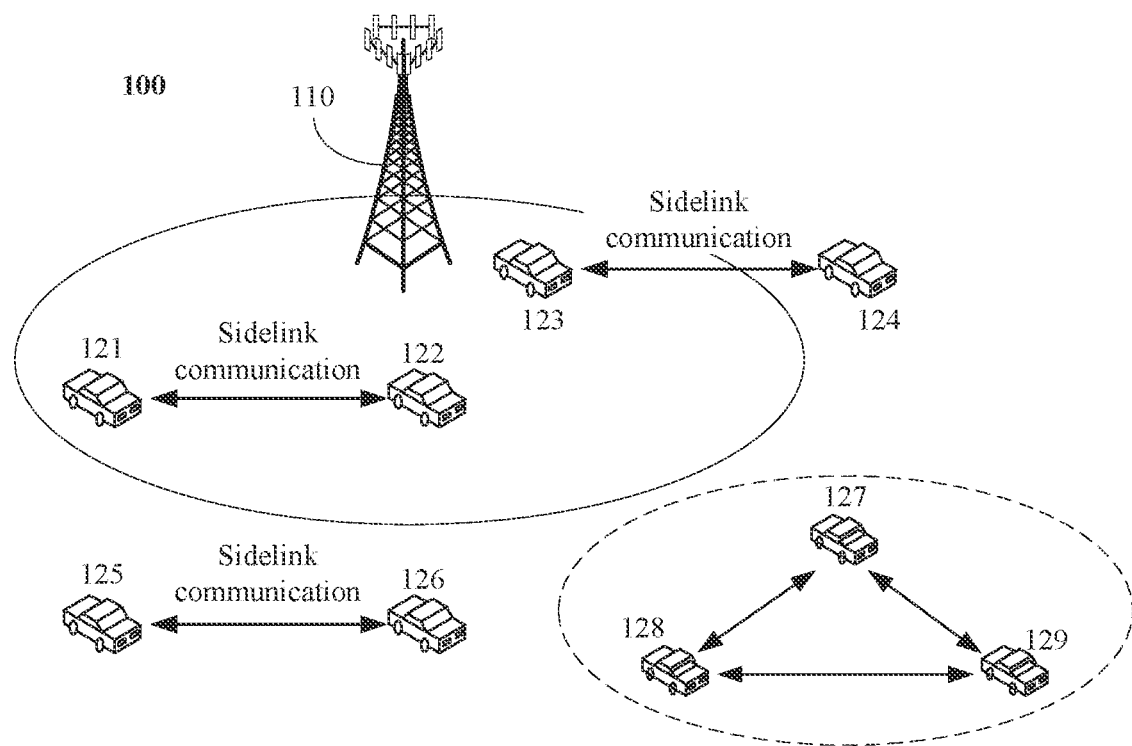
FIG. 1 shows a wireless communications system to which the embodiments of the present application are applied.
Figure 2:
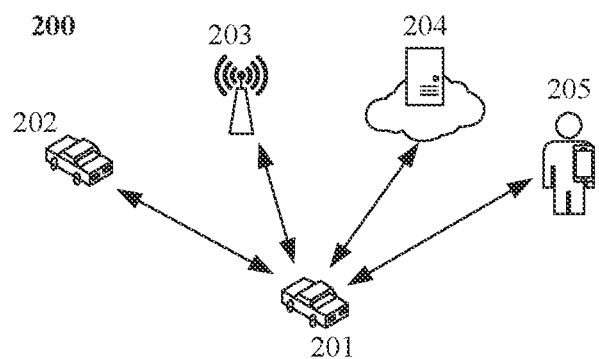
FIG. 2 is an example diagram of communication of NR-V2X.

FIG. 1 is an example diagram of a system architecture of a wireless communications system 100 to which the embodiments of the present application are applicable. The wireless communications system 100 may include a network device 110 and terminal devices 121 to 129. The network device 110 can provide communication coverage for a specific geographic area, and can communicate with terminals within the coverage area.

In some implementations, terminal devices may communicate with each other through a sidelink (SL). The sidelink communication may also be referred to as proximity services (ProSe) communication, unilateral communication, side link communication, device-to-device (D2D) communication, or the like.

In other words, sidelink data is transmitted between terminal devices over a sidelink. The sidelink data may include data and/or control signaling. In some implementations, the sidelink data may be, for example, a physical sidelink control channel (PSCCH), a physical sidelink shared channel (PSSCH), a PSCCH demodulation reference signal (DMRS), a PSSCH DMRS, or a physical sidelink feedback channel (PSFCH).

Several common sidelink communication scenarios are described below with reference to FIG. 1. Depending on whether the terminal devices in the sidelink are within the coverage of the network device, sidelink communication may include three scenarios. In scenario 1, the terminal devices perform sidelink communication within the coverage of the network device. In scenario 2, some of the terminal devices perform sidelink communication within the coverage of the network device. In scenario 3, the terminal devices perform sidelink communication outside the coverage of the network device.

As shown in FIG. 1, in scenario 1, terminal devices 121 and 122 can communicate with each other over a sidelink, and the terminal devices 121 and 122 are both within the coverage of the network device 110, or in other words, the terminal devices 121 and 122 are both within the coverage of the same network device 110. In this scenario, the network device 110 may send configuration signaling to the terminal devices 121 and 122, and accordingly, the terminal devices 121 and 122 communicate with each other over the sidelink based on the configuration signaling.

As shown in FIG. 1, in scenario 2, terminal devices 123 and 124 can communicate with each other over a sidelink, and the terminal device 123 is within the coverage of the network device 110, while the terminal device 124 is outside the coverage of the network device 110. In this scenario, the terminal device 123 receives configuration information from the network device 110, and communicates over the sidelink based on a configuration of the configuration signaling. However, since the terminal device 124 is outside the coverage of the network device 110, the terminal device 124 cannot receive the configuration information from the network device 110. In this case, the terminal device 124 may obtain a configuration of the sidelink communication based on pre-configured configuration information and/or the configuration information sent by the terminal device 123 within the coverage, so as to communicate with the terminal device 123 over the sidelink based on the obtained configuration.

In some cases, the terminal device 123 may send the configuration information to the terminal device 124 through a physical sidelink broadcast channel (PSBCH), so as to configure the terminal device 124 to communicate over the sidelink.

As shown in FIG. 1, in scenario 3, terminal devices 125 to 129 are all outside the coverage of the network device 110 and cannot communicate with the network device 110. In this case, all the terminal devices may perform sidelink communication based on pre-configuration information.

In some cases, the terminal devices 127 to 129 outside the coverage of the network device may form a communication cluster, and the terminal devices 127 to 129 in the communication cluster can communicate with each other. In addition, the terminal device 127 in the communication cluster may serve as a central control node, also referred to as a cluster header (CH). Correspondingly, the other terminal devices in the communication cluster may be referred to as "cluster members".

The terminal device 127 as the CH may have one or more of the following functions: responsible for establishment of the communication cluster; joining and leaving of the cluster members; resource coordination, allocation of sidelink transmission resources for the cluster members, and reception of sidelink feedback information from the cluster members; resource coordination with another communication cluster; and other functions.

It should be noted that FIG. 1 exemplarily shows a network device and a plurality of terminal devices. Optionally, the wireless communications system 100 may include a plurality of network devices, and another number of terminal devices may be included in the coverage of each network device, which is not limited in this embodiment of the present application.

Optionally, the wireless communications system 100 may further include other network entities such as a network controller and a mobility management entity, which is not limited in this embodiment of the present application.

It should be understood that the technical solutions in the embodiments of the present application can be applied to various communications systems, for example: a 5th generation (5G) system or new radio (NR) system, a long term evolution (LTE) system, an LTE frequency division duplex (FDD) system, and an LTE time division duplex (TDD). The technical solutions provided in the present application can also be applied to future communications systems, such as a 6th generation mobile communications system and a satellite communications system.

The terminal device in the embodiments of the present application may also be referred to as user equipment (UE), an access terminal, a subscriber unit, a subscriber station, a mobile, a mobile station (MS), a mobile terminal (MT), a remote station, a remote terminal, a mobile device, a user terminal, a wireless communications device, a user agent, or a user apparatus. The terminal device in the embodiments of the present application may be a device providing a user with voice and/or data connectivity and capable of connecting people, objects, and machines, such as a handheld device or vehicle-mounted device having a wireless connection function. The terminal device in the embodiments of the present application may be a mobile phone, a tablet computer (Pad), a notebook computer, a palmtop computer, a mobile internet device (MID), a wearable device, a vehicle, a wireless terminal in industrial control, a wireless terminal in self driving, a wireless terminal in remote medical surgery, a wireless terminal in a smart grid, a wireless terminal in transportation safety, a wireless terminal in smart city, a wireless terminal in smart home, or the like. Optionally, the terminal device may be used to act as a base station. For example, the terminal device may act as a scheduling entity, which provides a sidelink signal between terminal devices in vehicle-to-everything (V2X) or D2D, etc. For example, a cellular phone and a car communicate with each other using sidelink data. A cellular phone and a smart home device communicate with each other, without the relay of a communication signal through a base station.

The network device in the embodiments of the present application may be a device for communicating with the terminal device. The network device may also be referred to as an access network device or a wireless access network device. For example, the network device may be a base station. The network device in the embodiments of the present application may be a radio access network (RAN) node (or device) that connects the terminal device to a wireless network. The base station may broadly cover various names in the following, or may be interchangeable with the following names, for example: a NodeB, an evolved NodeB (eNB), a next generation NodeB (gNB), a relay station, a transmitting and receiving point (TRP), a transmitting point (TP), an access point (AP), a master eNB MeNB, a secondary eNB SeNB, a multi-standard radio (MSR) node, a home base station, a network controller, an access node, a radio node, a transmission node, a transceiver node, a base band unit (BBU), a remote radio unit (RRU), an active antenna unit (AAU), a remote radio head (RRH), a central unit (CU), a distributed unit (DU), and a positioning node. The base station may be a macro base station, a micro base station, a relay node, a donor node, or the like, or a combination thereof. Alternatively, the base station may be a communication module, a modem, or a chip arranged in the device or apparatus described above. Alternatively, the base station may be a mobile switching center, a device that assumes the function of a base station in D2D, V2X, and machine-to-machine (M2M) communications, a network-side device in a 6G network, a device that assumes the function of a base station in a future communications system, or the like. The base station can support networks of the same or different access technologies. A specific technology and specific device form used by the network device are not limited in the embodiments of the present application.

The base station may be fixed or mobile. For example, a helicopter or drone may be configured to act as a mobile base station, and one or more cells may move according to the position of the mobile base station. In other examples, a helicopter or drone may be configured to serve as a device in communication with another base station.

In some deployments, the network device in the embodiments of the present application may be a CU or a DU, or the network device includes a CU and a DU. The gNB may further include an AAU.

The network device and the terminal device may be deployed on land, including indoor or outdoor, handheld or vehicle-mounted; or may be deployed on water; or may be deployed on an airplane, a balloon, and a satellite in the sky. In the embodiments of the present application, the scenarios where the network device and the terminal device are located are not limited.

It should be understood that all or some of the functions of the communications device in the present application may also be implemented by software functions running on hardware, or by virtualization functions instantiated on a platform (such as a cloud platform).

With the development of sidelink communications technologies, the sidelink communications technologies relate to information exchange between various terminal devices. Taking a V2X communications system 200 shown in FIG. 2 as an example, vehicle-to-vehicle (V2V) communication between a terminal device 201 and a terminal device 202 relates to information exchange between the vehicles themselves. Vehicle-to-infrastructure (V2I) communication, vehicle-to-network (V2N) communication, and vehicle-to-pedestrian (V2P) communication respectively between the terminal device 201 and terminal devices 203 to 205 relate to information exchange between the vehicles and an external system.

Communications Spectrum for Sidelink

The spectrum used by the communications systems includes licensed spectrum and unlicensed spectrum. An important direction for the expansion of the communications systems to different fields is the use of unlicensed spectrum. For example, NR deployed on unlicensed spectrum is referred to as NR-U.

Currently, a sidelink mainly uses licensed spectrum. The sidelink may also use unlicensed spectrum. A sidelink deployed on unlicensed spectrum may be referred to as SL-U.

Compared with the licensed spectrum, the unlicensed spectrum has the feature of sharing without license. Therefore, the unlicensed spectrum is also referred to as shared spectrum. For operators, spectrum sharing facilitates spectrum aggregation in a timely manner to dynamically support high-bandwidth services. Spectrum sharing can also extend the benefits of communications technologies (e.g., NR) to an operating entity that may not have access to the licensed spectrum.

The shared spectrum needs to consider the coexistence of different radio access technology (RAT) systems, for example, typically a wireless fidelity (WiFi) system and an LTE-based license assisted access (LAA) system. Different systems use frequency bands in the unlicensed spectrum in a spectrum contention manner according to the principles of channel access fairness and multi-RAT coexistence.

In the shared spectrum, any RAT system needs to perform communication under the restrictions of the unlicensed spectrum regulatory rules. The regulatory rules include power and power spectral density levels, maximum channel occupancy time (COT), channel occupancy bandwidth, and channel monitoring mechanisms. In the same frequency band, each system needs to meet the requirements of the regulatory rules, and reasonably occupy and release channels, so as not to cause interference to another RAT system in the same frequency band.

For the use of the shared spectrum, the RAT system may employ a mandatory channel monitoring technology (e.g., LBT) to access a network. In other words, data can be transmitted only when it is detected that the current channel is not occupied. For example, a sidelink terminal device may initiate LBT, and the LBT can be Category 1 (Cat 1) LBT or Category 2 (Cat 2) LBT.

After obtaining a channel resource through the LBT, the terminal device transmits data based on the above regulatory rules. For example, the COT limit needs to be satisfied when the terminal device transmits data over the channel resource. In other words, a continuous data transmission should be limited within the COT time, and beyond this time, the terminal device needs to release the channel and perform LBT again.

Resource Allocation Method for Sidelink

The resource allocation method may be determined based on a service type of the terminal device. There are mainly two types of services of the sidelink terminal device: periodic services and non-periodic services. For the periodic services, the sidelink data of the terminal device is generally periodic. For example, in the road safety service of NR V2X, part of the sidelink data is periodic traffic that can arrive at a predictable time. For the non-periodic services, the arrival of data is random, and the size of a data packet is also variable.

In some communications systems (e.g., NR), two resource configuration modes for sidelink resources are defined, namely, mode 1 and mode 2.

In mode 1, the network device schedules a sidelink resource for the terminal device.

Currently, in mode 1, there may be two manners: dynamic resource configuration and sidelink configuration grant. In the dynamic resource configuration, the network device may send downlink control information (DCI) to allocate a sidelink transmission resource for the terminal device. In the sidelink configuration grant manner, after the terminal device is configured with a sidelink resource, if the terminal device has data to be transmitted, the terminal device can use the configured sidelink resource to transmit the data, without the need to request another sidelink resource from the network device. For the periodic services, the network device usually allocates a semi-static transmission resource for the terminal device. The network device schedules transmission resources for the terminal device on a direct link, which can effectively avoid a resource collision and resolve the hidden node problem.

For example, referring to FIG. 1, the terminal devices 121 to 123 are within the coverage of the network device 110, and the network device 110 may allocate sidelink resources for the terminal devices 121 to 123.

In mode 2, the terminal device independently selects a sidelink resource in a sidelink resource pool.

A distributed resource scheduling mechanism is used in this mode. The sidelink resource pool may be configured or pre-configured by the network device. In some embodiments, the network device may configure the sidelink resource pool to the terminal device through higher layer signaling. The terminal device relies on resource monitoring or random selection to independently select a time-frequency resource from the resource pool configured or pre-configured by the network device. For example, the terminal devices 124 to 129 in FIG. 1 are outside the coverage of the network device 110, and the terminal devices 124 to 129 each may independently select a sidelink resource from the resource pool configured by the network device.

In the periodic services, the sidelink may retain (or reserve) a sidelink communication resource for the terminal device at an expected data arrival time, so as to avoid resource contention with other terminal devices. For example, the sidelink terminal device may support resource retention for the periodic services by indicating a retention period in sidelink control information (SCI).

In mode 2, for services having obvious periodic characteristics, the terminal device may perform a resource allocation mechanism combining channel sensing and semi-persistent scheduling (SPS). This mechanism can make full use of the periodic characteristics of the services. A transmitter end reserves periodic transmission resources to carry the periodic services to be transmitted, which helps a receiver end to perform resource status sensing and collision avoidance, thereby improving resource utilization and transmission reliability.

For the non-periodic services, the terminal device performs a resource allocation mechanism combining sensing and single transmission. Since it is impossible to predict and reserve future resource occupancy, there is a relatively high probability of resource collision.

The channel sensing process of the terminal device includes a resource sensing process and/or a resource selection process. The resource sensing may also be referred to as resource monitoring or resource probing. The terminal device performs resource sensing and selection based on the dedicated sidelink resource pool, which can alleviate or avoid a potential resource collision between the terminal devices. For example, the terminal device may select a sidelink transmission resource from the resource pool by means of sensing.

In the resource sensing process, the terminal device may identify the occupancy (or reservation) of the sidelink resources by demodulating the SCI; that is, the terminal device can obtain resource reservation information of other terminal devices by demodulating the SCI. Alternatively, the terminal device may identify the occupancy of the sidelink resources by measuring a received power of the sidelink.

After the transmission resource reserved by the terminal device for the periodic service is retained, all other terminal devices that have received the retention message avoid selection and transmission on the retained resource. In some embodiments, the terminal device may select resources from the resource pool that are not reserved by other terminal devices or that are reserved by other terminal devices but have a relatively low received power, thereby reducing a resource collision probability and improving communication reliability.

The resource allocation mechanism of mode 2 works well in licensed or dedicated spectrum (frequency range). However, in the unlicensed spectrum, the resource allocation mechanism of mode 2 has some limitations.

When the resource allocation method of mode 2 is applied to SL-U, the uncertainty of channel monitoring needs to be considered. Due to the dependence on channel monitoring results, it is difficult for the sidelink to retain resources at a specific time. Currently, the sidelink retains a time window in an unlicensed channel. The time window may consist of a group of slots. These slots occur periodically. The time window starts approximately before the expected data arrival time to avoid a possible channel monitoring failure. The resources retained during the time window may be a set of time and frequency interleaved resource blocks (RBs). These resource blocks may be used as resources required for channel access.

In addition, there are already a large number of devices of other types of RATs in the unlicensed spectrum, such as WiFi devices, LAA devices, enhanced license assisted access (eLAA) devices, and NR-U devices. The channel resource required for the sidelink may not only be occupied by a sidelink terminal device, but may also be occupied by a device of another type of RAT. The legacy mode 2 process cannot identify and resolve a resource collision caused by a non-sidelink terminal device, which may cause a channel monitoring failure of the sidelink terminal device.

Further, the resource reservation of the sidelink terminal device is invalid for devices of other types of RATs. These devices cannot monitor the retention message sent by the sidelink terminal device, nor can they receive and understand the resource reservation information in the SCI. These devices attempt to occupy a channel that overlaps the retained resource, and continuously performs clear channel assessment (CCA) on the retained resource. The other terminal devices following the retention obtain fewer opportunities of CCA success, and the efficiency of the use of the legacy mode 2 by SL-U is reduced. Therefore, mode 2 resource selection is more useful when a legacy device is not nearby.

When the sidelink terminal device is operating within the network coverage, a nearby terminal device does not listen to the reservation message either. In order to reduce a collision of the resource reservation, the sidelink terminal device may forward the retention signal to the network device, and the network device may avoid scheduling uplink transmission on the retained resource.

In mode 2, the terminal device performs a resource selection procedure to determine transmission resources for the corresponding PSCCH/PSSCH and PSFCH. On the unlicensed spectrum, the terminal device usually starts resource selection only after the channel monitoring is successful. Different from NR-U, the sidelink terminal device needs to be able to perform multi-channel access independently, rather than being scheduled or indicated.

Channel Access for Sidelink

After the terminal device detects that a channel is idle through a channel monitoring mechanism such as LBT, the terminal device performs channel access on the idle resource to transmit data. Therefore, a monitoring and avoidance mechanism such as LBT is also referred to as a channel access mechanism.

In some protocols (R16/R17), a sidelink-capable terminal device performs channel access on a per-slot basis, which is full-slot channel access. A duration of a slot is related to a subcarrier spacing. In some communications systems (e.g., NR), a plurality of subcarrier spacings can be supported, and the structure of a radio frame slightly vary depending on the subcarrier spacings. A duration of the radio frame and that of a subframe do not vary with the subcarrier spacing. The duration of the radio frame is always 10 ms, and the duration of the subframe is always 1 ms.

A subframe consists of one or more slots, and a duration of a slot is related to a subcarrier spacing. For example, when the subcarrier spacing is 15 kHz, a duration of one slot is 1 ms, which is the same as the duration of the subframe. When the subcarrier spacing is 30 kHz, a duration of one slot is 0.5 ms, and two slots forms a subframe. However, the number of symbols in a slot does not change with the subcarrier spacing, but only a configuration type of the slot changes. Typically, one slot includes 14 symbols.

In channel access based on the full slot including 14 symbols, the terminal device uses every 14 symbols as a transmission start point based on a synchronization time point. The transmission start point may also be referred to as a channel access position. In this manner, regardless of a time point at which the terminal device performs channel monitoring, after the monitoring is successful, the terminal device needs to wait for the next transmission start point to perform channel access. In other words, after the channel monitoring is successful, the terminal device needs to wait for the next slot to perform data transmission.

Figure 3:
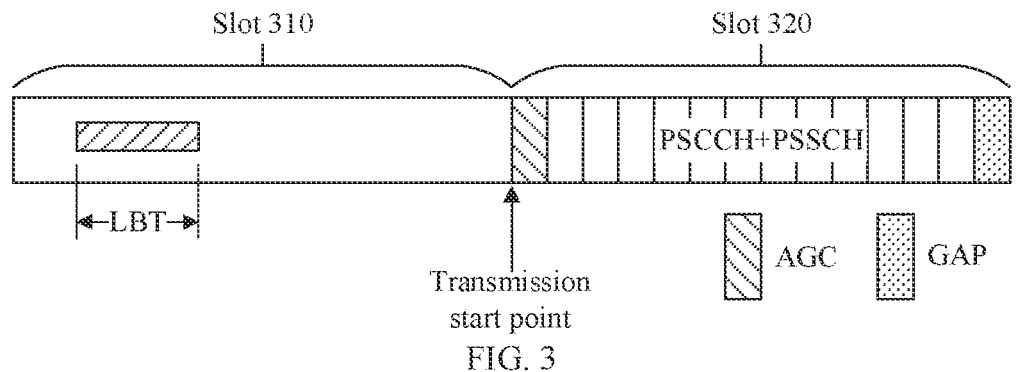
FIG. 3 is a schematic diagram of a full-slot channel access mode.

With reference to FIG. 3, the full-slot channel access mode is described below by using an example in which the terminal device transmits a PSCCH/PSSCH through LBT.

Referring to FIG. 3, the terminal device completes the LBT in the early stage of a slot 310. In the full-slot channel access mode, the terminal device needs to wait for a slot 320 to transmit the PSCCH/PSSCH. As shown in FIG. 3, a transmission start point is located at a start position of the slot 320. In the slot 320, the first symbol is used as an automatic gain control (AGC) symbol, and data on the AGC symbol is usually not used for data demodulation. The last symbol is a guard gap GAP symbol. The PSCCH/PSSCH is between the AGC and the GAP. In the sidelink, a slot basically does not carry uplink or downlink symbols.

Compared with the slot 320, only a few symbols in the slot 310 are used for the LBT of the terminal device. The terminal device cannot utilize symbols between the LBT in the slot 310 and the transmission start point. Therefore, resources on a plurality of symbols in the slot 310 are wasted.

As shown in FIG. 3, after completing the LBT in the slot 310, the terminal device performs data transmission in the slot 320. Because the availability of a channel in the shared spectrum cannot be ensured all the time, the terminal device needs to perform CCA before the data transmission, which is performed only when it is ensured that the channel is idle. For example, the terminal device may measure channel energy on an LBT bandwidth (BW) based on a 20 MHz RB set.

Figure 4:
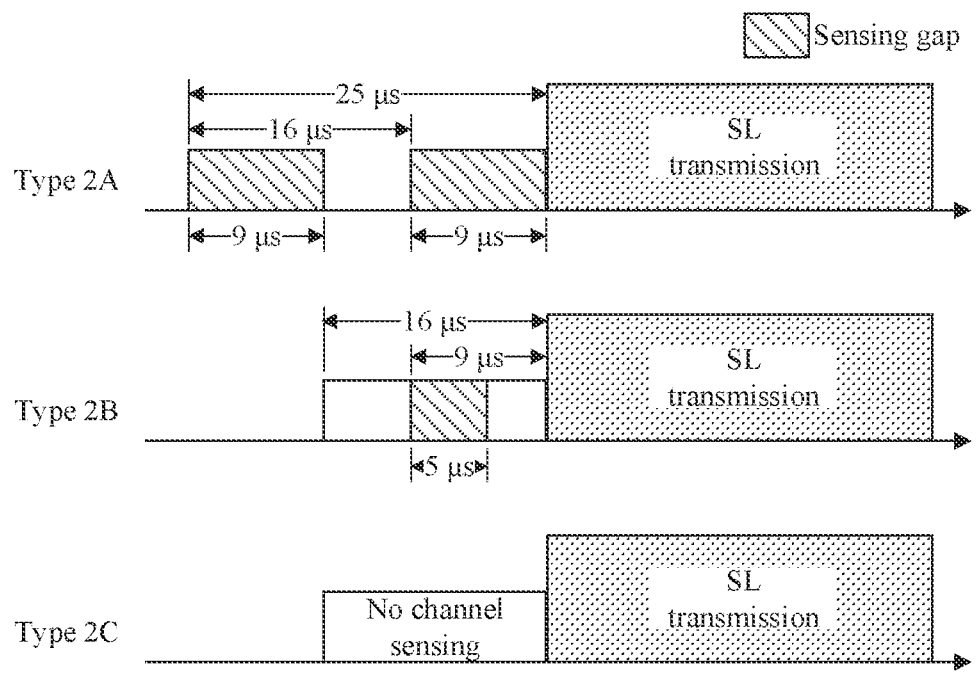
FIG. 4 is a schematic diagram of three channel access modes in NR-U.

In the unlicensed spectrum, the channel assessment before the data transmission includes a plurality of channel access modes. The channel access process before the data transmission is described below with reference to three channel access modes of NR-U in FIG. 4. Referring to FIG. 4, Type 2A (Type2A) and Type 2B (Type2B) channel access processes both have a channel sensing gap (sensing gap), and Type 2C (Type2C) does not require channel sensing.

Taking Type 2A channel access in FIG. 4 as an example, after the terminal device senses that the channel (medium) is idle based on an appropriate energy detection threshold, there is a delay period before SL transmission. The delay period for Type 2A in FIG. 4 is 25 μs. As shown in FIG. 4, the delay period of 25 μs mainly includes a delay time of 16 μs and a contention slot of 9 μs. The terminal device performs explicit CCA on the contention slot. The delay period can avoid a collision with a potential WiFi confirmation time (16 μs), and can also make time for the terminal device to get ready.

In the Type 2A channel access, the contention slot of 9 μs may also be referred to as short-term LBT or additional LBT. The delay period of the channel access may be adjusted by setting a specific number of additional LBTs. Therefore, the minimum duration of the delay period for Type 2A is 25 μs.

During the channel access based on Type 2A, once the terminal device is ready, the additional LBT can be cleared to directly start the transmission. If the terminal device is still not ready after the countdown of the delay period has completed, the channel access is to be declared as failed, and this process should be started over. In some cases, a device from another RAT may complete its LBT and start transmission before the next transmission start point of the SL-U terminal device. The additional LBT allows the SL-U terminal device to detect such a case and delay the access. For example, in FIG. 3, when the terminal device clears the additional short-term LBT, if a WiFi node has cleared its LBT before the transmission start point, the WiFi node occupies the channel. Therefore, a transmission resource collision occurs, and the SL-U terminal device fails to access.

During the channel access in the shared spectrum, the sidelink needs to clear the additional LBT before the data transmission, while other systems in the shared spectrum may not need to perform the corresponding operation. For example, a WiFi system can start transmission asynchronously at any time point. If the sidelink coexists with a WiFi-like system, a sidelink system having fixed and potentially sparse transmission start points would waste resources greatly or severely affect system throughput.

As described above, the current channel access mode for the sidelink is full-slot channel access. In one slot, there may be a plurality of terminal devices that perform channel monitoring. If the plurality of terminal devices all perform the monitoring successfully in this slot, the plurality of terminal devices all need to wait for the next slot to perform data transmission. Therefore, the plurality of terminal devices may have a resource collision at the transmission start point of the next slot.

Taking the Type 2A channel access process as an example, the resource collision occurring in the channel access is specifically described below with reference to FIG. 5.

Figure 5:
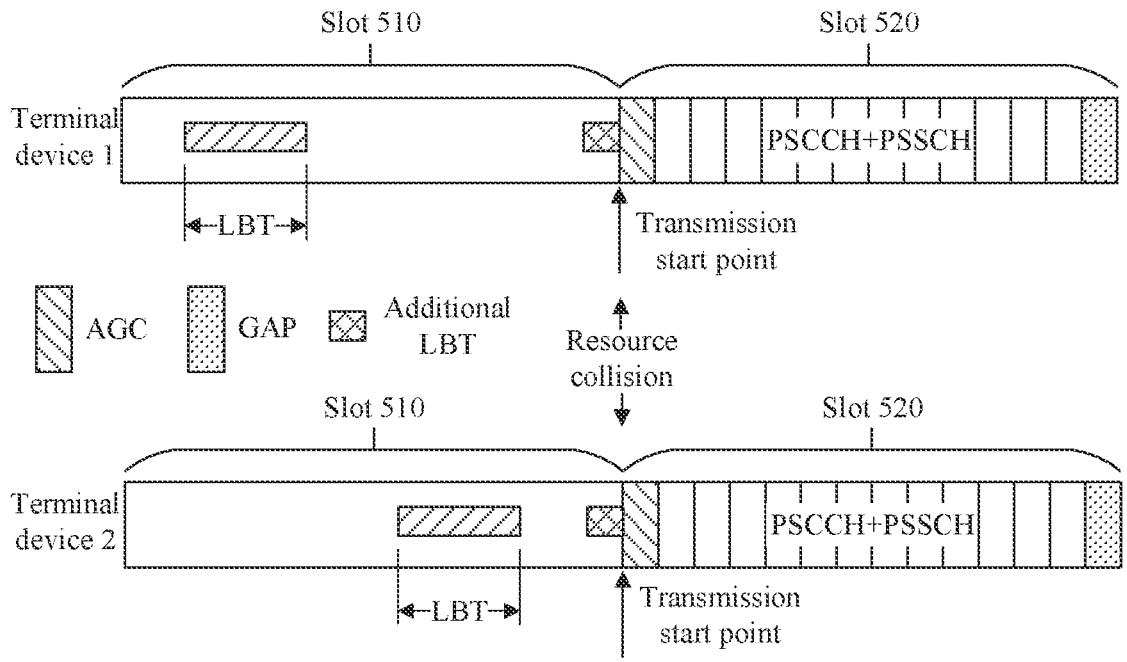
FIG. 5 is a schematic diagram of a resource collision occurring in channel access.

Referring to FIG. 5, both a terminal device 1 and a terminal device 2 perform LBT in a slot 510. The terminal device 1 completes the LBT in the early stage of the slot 510 and needs to wait for a slot 520 to transmit a PSCCH/PSSCH. While the terminal device 1 is waiting, the terminal device 2 also completes the LBT in the late stage of the slot 510. Both the terminal devices are to transmit the PSCCH/PSSCH in the slot 520.

Before a transmission start point shown in FIG. 5, both the terminal devices determine whether the channel is idle by means of an additional short-term LBT. Only after the channel is determined to be idle in a contention slot of the additional LBT, the terminal device 1 or the terminal device 2 can access the channel and perform data transmission.

As shown in FIG. 5, after the terminal device 1 and the terminal device 2 complete the countdown of the LBT in the slot 510, the two terminal devices have a resource collision at the additional LBT before the alignment of the transmission start points.

The resource waste shown in FIG. 3 and the resource collision shown in FIG. 5 are both due to the channel access for the sidelink on a per-slot basis. After the channel monitoring is successful, the terminal device needs to wait for the next slot to perform the channel access, and the waiting time interval is relatively long.

In view of this, the embodiments of the present application provide a sidelink communication method and apparatus. A slot structure of the method provides a more flexible channel access position, and a time interval for which the terminal device needs to wait after completing channel monitoring is reduced, thereby reducing waste of resources.

A sidelink communication method according to an embodiment of the present application is described below with reference to FIG. 6.

Figure 6:
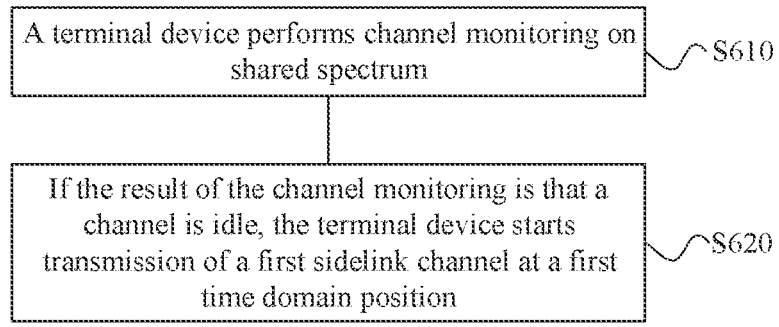
FIG. 6 is a schematic flowchart of a sidelink communication method according to an embodiment of the present application.

Referring to FIG. 6, at step S610, a terminal device performs channel monitoring on shared spectrum.

The terminal device is a device that performs sidelink communication. The terminal device may be a device that is to transmit data in the sidelink communication.

The terminal device may perform unicast communication, multicast communication, or broadcast communication with other terminal devices. In some embodiments, the terminal device that performs the channel monitoring may be a cluster header that initiates multicast or broadcast communication, or may be a cluster member in the multicast or broadcast communication. For example, in V2X, the terminal device that performs the channel monitoring may be a vehicle that performs multicast communication with other vehicles, or may be other vehicles in the multicast communication.

In some embodiments, the terminal device that performs the channel monitoring may be within the coverage of a network, or may be outside the coverage of the network. A terminal device within the coverage of the network may perform the channel monitoring in the shared spectrum based on a configuration of a network device.

The channel monitoring may mean that the terminal device monitors a plurality of channel resources in the shared spectrum, or monitors a target channel resource.

The channel resource may be a resource in the shared spectrum, or a COT resource shared by another terminal device in the sidelink. For example, in V2X, the terminal device may perform channel monitoring for COT sharing provided by nearby vehicles.

In some embodiments, the channel monitoring may mean that the terminal device monitors the channel resource by using the LBT mechanism, or that the terminal device performs monitoring by channel sensing or other means. For example, the terminal device may determine the occupancy of sidelink resources based on a value of a reference signal received power (RSRP) of a sidelink DMRS.

The result of the channel monitoring may be that the monitored channel resource is idle, or that the monitored channel is occupied. If the result of the channel monitoring is that the channel is occupied, the terminal device may continue to perform the channel monitoring until an idle channel is found.

At step S620, if the result of the channel monitoring is that a channel is idle, the terminal device starts transmission of a first sidelink channel at a first time domain position.

The first time domain position may be a transmission start point after the channel access of the terminal device. The terminal device may perform sidelink data transmission at the first time domain position.

In some embodiments, the first time domain position may be a specified time domain position. The terminal device transmits a first sidelink channel at the specified time domain position, which is not affected by the configuration of the transmission start point, making the access more flexible. For example, the first time domain position may be an odd-numbered symbol in a slot after time point synchronization, or an even-numbered symbol in the slot after the time point synchronization. For another example, the first time domain position may be any symbol after the channel monitoring is completed.

Figure 7:
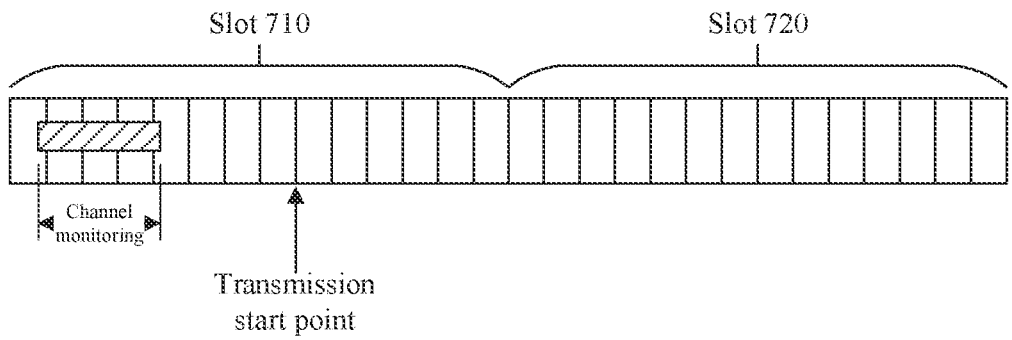
FIG. 7 is a schematic diagram of a specified-position channel access method according to an embodiment of the present application.

FIG. 7 is a schematic diagram of data transmission at a specified position. Referring to FIG. 7, the ninth symbol of a slot 710 is a sidelink transmission start point. After completing channel monitoring in the first to fifth symbols of the slot 710, the terminal device performs channel access in the ninth symbol of the slot 710. In other words, the fourth symbol after the completion of the channel monitoring may be specified as the first time domain position. As shown in FIG. 7, the terminal device can effectively utilize resources in the slot 710 for data transmission, without the need to wait for the slot 720 to access.

In some embodiments, the first time domain position may be indicated based on first indication information. The first indication information may be carried in control signaling. For example, the first indication information may be carried in scheduling indication information of SCI.

In some embodiments, the first time domain position may be a time domain position determined based on a first time unit. The first time unit may be a time unit less than one slot.

As a possible implementation, the first time unit may be a half slot. After the channel monitoring is successful in the early stage of a slot, the terminal device may perform sidelink transmission in a half slot, which helps to reduce waste of resources. This channel access mode may be referred to as half-slot channel access. For example, when a slot includes 14 symbols, the half-slot channel access means that every seven symbols are used as a transmission start point based on a synchronization time point.

Figure 8:
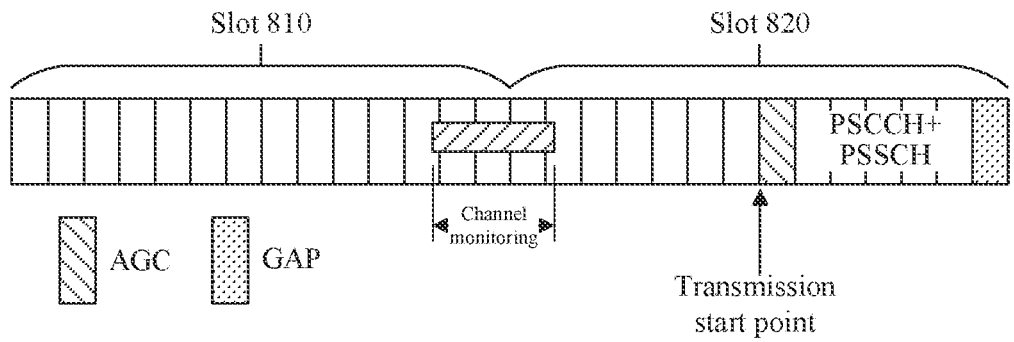
FIG. 8 is a schematic diagram of a half-slot channel access method according to an embodiment of the present application.

FIG. 8 is a schematic diagram of half-slot channel access. Referring to FIG. 8, a half-slot position of a slot 820 is a transmission start point. After completing channel monitoring in the last three symbols of a slot 810 and the first two symbols of the slot 820, the terminal device performs channel access at the half slot position of the slot 820. As shown in FIG. 8, after completing the channel monitoring in the second symbol of the slot 820, the terminal device does not need to wait for the next slot to perform data transmission.

A duration of the first time unit in the half-slot channel access is related to the subcarrier spacing. For example, when the subcarrier spacing is 30 kHz, the duration of the slot is 0.5 ms, and the duration of the first time unit is 0.25 ms.

As a possible implementation, the first time unit may be one or more symbols. The number of the plurality of symbols may be any integer less than the total number of symbols in the slot. When the plurality of symbols are less than the half slot, the time interval for which the terminal device waits to perform data transmission after the successful monitoring is shorter. For example, every three symbols are used as a transmission start point based on the synchronization time point.

When one or more symbols are used as the first time unit, the duration of the first time unit is related to the number of symbols and a duration of each symbol. The duration of each symbol is related to the subcarrier spacing. For example, when the subcarrier spacing is 15 kHz, the duration of each symbol is 66.7 μs.

As a possible implementation, the first time unit may be one or more microseconds. When the first time unit is a plurality of microseconds, the terminal device may perform channel access based on a finer time unit. For example, when a plurality of terminal devices perform data transmission at the same time domain position, symbols near the time domain position are divided into a plurality of microsecond contention slots. In other words, the first time domain position is set with a granularity of a plurality of microseconds. Each terminal device may select one of the contention slots as a transmission start point according to the standard or configuration. In principle, when the plurality of terminal devices expects to perform data transmission at the same time domain position, the terminal device that completes the channel monitoring earlier is allowed to occupy this position. Therefore, it can be specified that the terminal device that completes the channel monitoring earlier preferentially selects the first time domain position.

When the first time unit is a plurality of microseconds, the problem of resource collision can be effectively resolved. For ease of understanding, taking resolving the resource collision shown in FIG. 5 as an example, the finer channel access mode is described below in detail with reference to FIG. 9.

Figure 9:
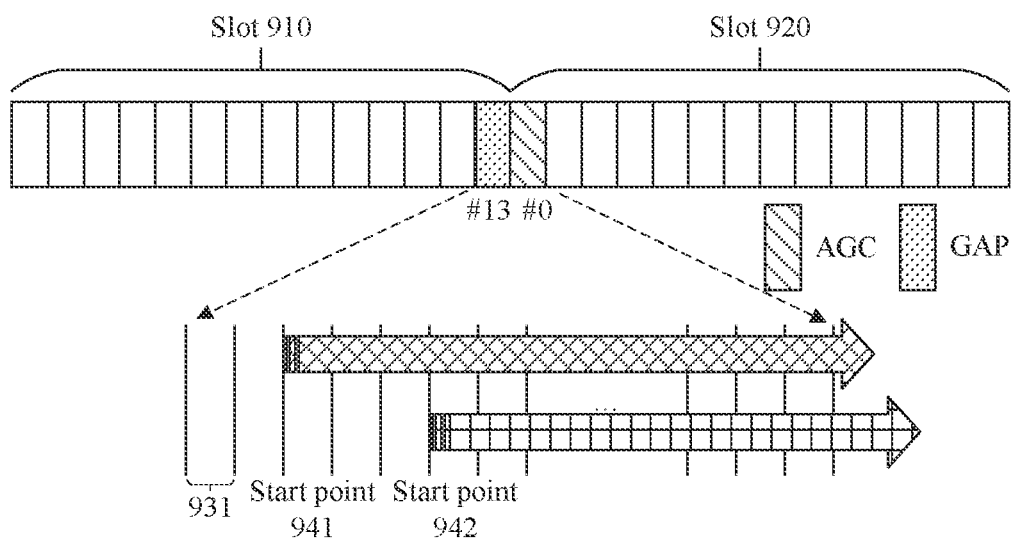
FIG. 9 is a schematic diagram of a finer channel access method according to an embodiment of the present application.

Referring to FIG. 9, considering that the resource collision in FIG. 5 occurs at a contact point of two slots, the two symbols adjacent to the contact point are divided. In other words, the last symbol (#13) of a slot 910 and the first symbol (#0) of a slot 920 are divided into time units 931.

In the figure, a start point 941 is a transmission start point of a terminal device 1, and a start point 942 is a transmission start point of a terminal device 2. The terminal device 1 and the terminal device 2 may synchronize the additional LBT shown in FIG. 5 to their respective transmission start points, and start transmission after CCA.

If the start point 941 and the start point 942 occur in the last symbol of the slot 910, the terminal devices may directly start transmission. If the start point 941 and the start point 942 occur in the first symbol of the slot 920, the terminal devices may initiate transmission by masking an AGC symbol shown in FIG. 9.

It can be seen from FIG. 9 that through the finer time division, the more specific microsecond-level channel access can avoid the collision to the greatest extent. The access based on a multi-microsecond slot shown in FIG. 9 may occur in any system-specified symbol.

In some embodiments, the one or more microseconds may be determined based on a specified time unit. The specified time unit may be specified by indication information carried in control signaling. For example, the SCI is used to specify that a contention slot when a plurality of terminal devices perform channel access is 20 microseconds.

In some embodiments, alternatively, the one or more microseconds may be determined based on a duration of the channel monitoring. The first time unit needs to satisfy the access requirement for the channel monitoring. For example, a first time unit of 9 μs can satisfy the minimum time requirement for the additional LBT shown in FIG. 4. For another example, a first time unit of 16 μs can satisfy the Type 2B access mode shown in FIG. 4. For another example, a first time unit of 25 μs can satisfy the Type 2A access mode shown in FIG. 4.

As a possible implementation, the plurality of microseconds may be a first value or an integer multiple of the first value. The first value may be a specified time unit, or a time unit determined based on the duration of the channel monitoring. For example, the first value may be 9 μs, 16 μs, or 25 μs.

The first sidelink channel may include one or more of channels such as a PSCCH, a PSSCH, and a PSFCH, which is not limited herein.

It can be known from the foregoing description that the embodiments of the present application increase the number of SL-U transmission start points on the basis of the full-slot channel access supported by the current 3rd generation partnership project (3GPP) protocol. The SL-U slot structure supports specified-position access, half-slot access, finer access, and other access modes, which improves the flexibility of channel access, reduces the probability of resource collision, and reduces waste of resources and an access delay caused by a channel access delay.

As described above, in the resource scheduling manner of the sidelink mode 2, the terminal device needs to perform resource selection after the successful channel monitoring. During the duration of sensing and transmission preparation processing by the terminal device, another RAT may access and occupy the channel, which makes the previous channel monitoring of the terminal device invalid.

Figure 10:
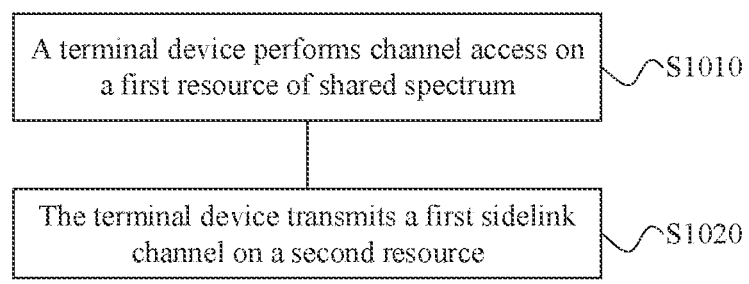
FIG. 10 is a schematic flowchart of another sidelink communication method according to an embodiment of the present application.

In view of this, the embodiments of the present application propose another sidelink communication method and apparatus. In this method, after the successful channel monitoring and access, the terminal device can obtain resources required for subsequent transmission without resource selection. The sidelink communication method is described in detail below with reference to FIG. 10. The method shown in FIG. 10 is related to FIG. 6. Therefore, for the sake of brevity, the terms that have already appeared in FIG. 6 are not explained in detail again in FIG. 10.

Referring to FIG. 10, at step S1010, a terminal device performs channel access on a first resource of shared spectrum.

The channel access may be initial access of the terminal device for data transmission. In some embodiments, the channel access may include only the initial access performed by the terminal device. For example, the channel access may be resource sensing and access. In some embodiments, the channel access may include the channel monitoring and the initial access that are performed by the terminal device.

The first resource may be a specified time-frequency resource or a reserved time-frequency resource in the shared spectrum, or may be a shared resource in a resource pool corresponding to another terminal device in the shared spectrum. The terminal device performs the channel access on the first resource, and the first resource may also be referred to as an access resource.

In some embodiments, the shared resource as the first resource may be a resource in the resource pool configured by a network for another terminal device, or may be a resource in the resource pool obtained by another terminal device through channel monitoring. For example, the first resource may be a reserved resource in the resource pool of another terminal device.

In some embodiments, the first resource may be used by the terminal device to perform resource sensing and access. The first resource may be used as a resource required by the terminal device for the initial access, or may be used as a resource required by the terminal device for the channel monitoring and the initial access. For example, the first resource may determine the channel monitoring and access of the terminal device.

In some embodiments, the first resource may be used by the terminal device for an initial transmission. The terminal device may perform channel monitoring before the first resource, and if no available channel is found, the terminal device may wait on the first resource.

In some embodiments, the first resource may also be used for a retransmission resource in a dedicated frequency range. For example, the first resource may be used for some retransmissions of a transport block (TB).

In some embodiments, information about the first resource may be notified in a plurality of manners. For example, dedicated control signaling may be utilized to notify the first resource to a sidelink terminal device. For another example, broadcast information may be used to notify the first resource to the sidelink terminal device.

At step S1020, the terminal device transmits a first sidelink channel on a second resource.

The second resource may be a time-frequency resource available to the channel that is discovered by the terminal device through channel monitoring. The terminal device transmits data on the second resource, and the second resource may also be referred to as a transmission resource. For example, the second resource may be an available resource in the shared spectrum, or may be a shared resource in the resource pool of another terminal device.

The second resource may be a resource block in the resource pool that is associated with the first resource. In some embodiments, the second resource may be consecutive resource blocks, a single resource block, or discrete resource blocks.

In some embodiments, when the first resource is used as a resource required for access, the first resource may be associated with the second resource in the resource pool. For example, the first resource may serve as an index of the second resource. The second resource in the resource pool can be mapped according to an indication of the index of the first resource.

The second resource may be a resource required by the terminal device for subsequent transmission after the successful channel monitoring. For example, when the first resource is the index of the second resource, as long as the terminal device successfully performs the channel monitoring on the first resource, the resource index can point to a resource required for the subsequent transmission of the service. The terminal device does not need to perform subsequent resource selection or request resource allocation, so that a possible resource collision problem can be avoided.

In some embodiments, an association relationship between the first resource and the second resource may also be notified in a plurality of manners. For example, the dedicated control signaling may be utilized to notify the association relationship to the sidelink terminal device. For another example, the broadcast information may be used to notify the association relationship to the sidelink terminal device.

The association relationship between the first resource and the second resource may be determined based on one or more types of information.

In some embodiments, the association relationship between the first resource and the second resource may be determined based on first information. The first information may be used for indicating a time domain position of the second resource. For example, the first information may include a time domain start position and a duration of the second resource. For another example, the first information may include the time domain start position and an end time of the second resource.

As a possible implementation, ConfigIndex is used to represent the first information, $T_{initial}$ to represent the time domain start position, and L to represent the duration. The first information satisfies:

$$\text{ConfigIndex} \in [T_{initial}, T_{initial}+L],$$

where $T_{initial}$, as the start symbol in time domain of the second resource, may be determined based on a synchronization time point. L may be a symbol length of the persistence of the second resource.

As a possible implementation, the time domain start position of the second resource may be a time domain start position of a first time unit, or a time domain start position indicated by indication information. The first time unit may be a slot, a half slot, one or more symbols, or one or more microseconds, which is not limited herein. For example, when a slot includes 14 symbols, and the first time unit is a slot, a time domain position of every 14 symbols is $T_{initial}$ based on a synchronization timeline. When the first time unit is a half slot, a time domain position of every seven symbols is $T_{initial}$ based on the synchronization timeline. For another example, the time domain position specified by the indication information is $T_{initial}$.

In some embodiments, when a plurality of terminal devices expect to transmit a sidelink channel on the second resource, the first information may be determined based on one or more types of information. The information may be a maximum value of an available time domain resource in the resource pool, such as a maximum available symbol number or a maximum symbol number that can be shared by the COT. The information may be the total number, e.g., K, of second resources in time domain of the resource pool, K being a positive integer. The information may also be the number of terminal devices. For example, there are M actually connected terminal devices at a time, where M may be a positive integer less than or equal to K. The information may be the number, e.g., K/M, of second resources corresponding to each terminal device in the time domain.

As a possible implementation, the time domain resources in the resource pool are equally divided. After $T_{max}$ time domain resources are equally divided into K, L mentioned above may be expressed as $L=T_{max}/K$, and the first information of each resource block satisfies:

ConfigIndex$\in[T_{initial}, T_{initial}+(T_{max}/K)]$.

The first information of an $i^{th}$ resource block satisfies:

ConfigIndex$\in[T_{initial}^i, T_{initial}^i+(T_{max}/K)]$, where i is an integer of value 0 to K−1, and $T_{initial}^i$ is a symbol in a specific slot during channel access for a service corresponding to the $i^{th}$ resource block after the successful channel monitoring.

If M terminal devices access the resource pool to which the second resource belongs, and the time domain resources are equally divided, the first information ConfigIndex corresponding to an $i^{th}$ terminal device in the M terminal devices satisfies:

ConfigIndex$\in[T_{initial}^i, T_{initial}^i+P\times(T_{max}/K)]$, where i is an integer of value 0 to M−1, $T_{initial}^i$ represents a time domain start position of a second resource corresponding to the $i^{th}$ terminal device, P represents the number of second resources corresponding to the $i^{th}$ terminal device in time domain, $T_{max}$ represents the maximum value of the available time domain resource in the resource pool, and K represents the total number of second resources in time domain of the resource pool. Because the resources are equally divided, P may be defined as K/M.

As a possible implementation, the time domain resources in the resource pool may not be equally divided. For example, the number of symbols of each resource block may be sorted according to a differential sequence, or may be sorted according to an increasing sequence or a decreasing sequence.

In some embodiments, the association relationship between the first resource and the second resource may be determined based on second information. The second information may be used for indicating a frequency domain position of the second resource. For example, the second information may include a frequency domain start position and a frequency domain size of the second resource. For another example, the second information may include the frequency domain start position and a frequency domain end position of the second resource.

As a possible implementation, the second information may be represented by FreqIndex. FreqIndex may indicate which physical resource block (PRB) the second resource starts from in frequency domain, or may indicate the frequency domain size occupied by the second resource. For example, the RBs occupied by the second resource may be one or more consecutive RBs, or may be a plurality of inconsecutive RBs. For another example, a plurality of RBs among the RBs occupied by the second resource may be fixed values, or may be set differently according to priority levels of the terminal devices or transmission services.

As a possible implementation, the RBs in the resource pool are sorted based on frequency indexes. For example, starting from the lowest frequency of the resource pool, the RBs are numbered in ascending order of frequency. n_SL_PRB may be a starting RB number in frequency domain of the second resource in the resource pool, and $RB_{offset}$ may be the number of RBs offset by the second resource in frequency domain. Therefore, the second information satisfies:

FreqIndex$\in[n\_SL\_PRB, n\_SL\_PRB+RB_{offset}]$, where n_SL_PRB represents the frequency domain start position, and $RB_{offset}$ represents the frequency domain size.

In some embodiments, when a plurality of terminal devices expect to transmit a sidelink channel on the second resource, the second information may be determined based on one or more types of information. The information may be a maximum value of an available frequency domain resource in the resource pool, such as a maximum available resource number $N_{BWP}^{size}$ in a bandwidth part (BWP). The information may be the total number, e.g., K, of second resources in frequency domain of the resource pool. The information may be the number, e.g., M, of terminal devices. The information may be the number, e.g., K/M, of second resources corresponding to each terminal device in frequency domain.

As a possible implementation, the frequency domain resources in the resource pool are equally divided. After $N_{max}$ frequency domain resources are equally divided into K, $RB_{offset}$ mentioned above may be expressed as $RB_{offset}=N_{max}/K$, and the second information of each resource block satisfies:

FreqIndex$\in[n\_SL\_PRB, n\_SL\_PRB+(N_{max}/K)]$.

The second information of the $i^{th}$ resource block satisfies:

FreqIndex$\in[n\_SL\_PRB_i, n\_SL\_PRB_i+(N_{max}/K)]$; and $n\_SL\_PRB_i=n\_SL\_PRB_0+i\times(N_{max}/K)$, where i is an integer of value 0 to K−1.

If the M terminal devices access the resource pool to which the second resource belongs, and the frequency domain resources are equally divided, the second information FreqIndex corresponding to the $i^{th}$ terminal device in the M terminal devices satisfies:

FreqIndex$\in[n\_SL\_PRB_i, n\_SL\_PRB_i+P\times(N_{max}/K)]$; and $n\_SL\_PRB_i=n\_SL\_PRB_0+i\times P\times(N_{max}/K)$, where i is the integer of value 0 to M−1, $n\_SL\_PRB_i$ represents a frequency domain start position of the second resource corresponding to the $i^{th}$ terminal device, P represents the number of second resources corresponding to the $i^{th}$ terminal device in frequency domain, $N_{max}$ represents the maximum value of the available frequency domain resource in the resource pool, and K represents the total number of second resources in frequency domain of the resource pool. Because the resources are equally divided, P may be defined as K/M.

As a possible implementation, the frequency domain resources in the resource pool may not be equally divided. For example, the number of RB s of each resource block may be sorted according to a differential sequence, or may be sorted according to an increasing sequence or a decreasing sequence.

In some embodiments, the association relationship between the first resource and the second resource may be determined based on first information and second information. The first information is used for indicating a time domain position of the second resource, and the second information is used for indicating a frequency domain position of the second resource. A position of the second resource may be determined based on the index of the first resource, so as to avoid a subsequent resource collision. For example, the index may be expressed as Index(x, y), where x represents a time domain parameter of the second resource, and y represents a frequency domain parameter of the second resource.

As a possible implementation, the index of the first resource for the terminal device to perform initial access on the shared spectrum may be Index(ConfigIndex, FreqIndex). ConfigIndex and FreqIndex of the second resource are determined according to the method described above. After the successful channel monitoring, the terminal device may determine a position for transmitting the PSCCH/PSSCH/PSFCH based on the index.

As a possible implementation, after the plurality of terminal devices perform channel access, the available resources in the resource pool may be divided based on the number of terminal devices, so as to obtain a time-frequency resource (ConfigIndex, FreqIndex) allocated to each terminal device.

As a possible implementation, the available time-frequency resources in the resource pool are equally divided. When the available time-frequency resources are equally divided into second resources of the same size, the sidelink can obtain the most channel resources. For example, when the time-frequency resources are divided into $N_{RBG}$ resource groups, $N_{RBG}$ represents the number of resource block groups (RBGs). $N_{RBG}$ also represents a maximum allowed value of terminal devices that can be allocated resources in the resource pool.

As a possible implementation, the available resources in the resource pool are divided into resource blocks of different sizes. Each terminal device may perform transmission on the second resources of different sizes based on service requirements. For example, the size of each resource block may be sorted according to a differential sequence, or may be sorted according to an increasing sequence or a decreasing sequence.

Figure 11:
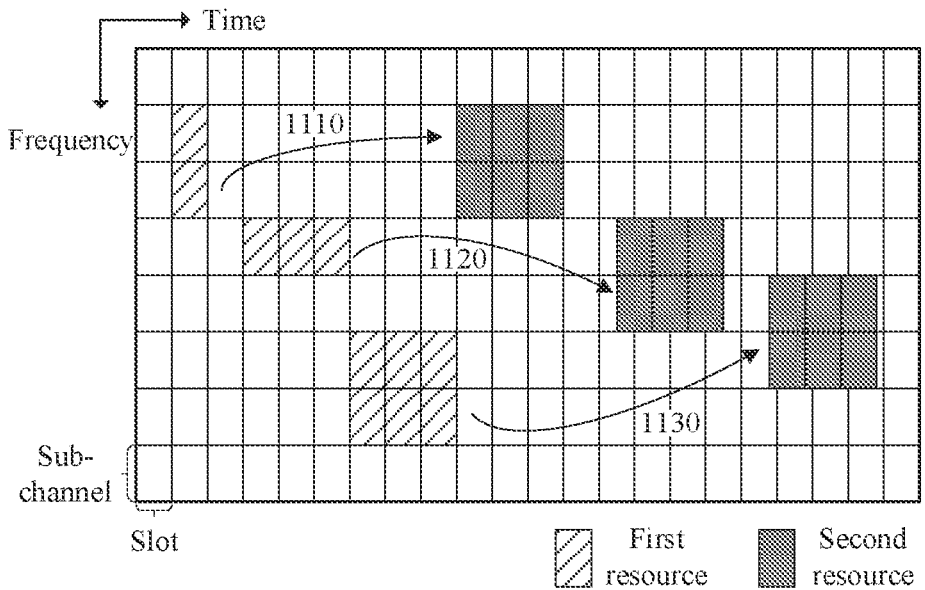
FIG. 11 is a schematic diagram of an association between a first resource and a second resource according to an embodiment of the present application.
Figure 12:
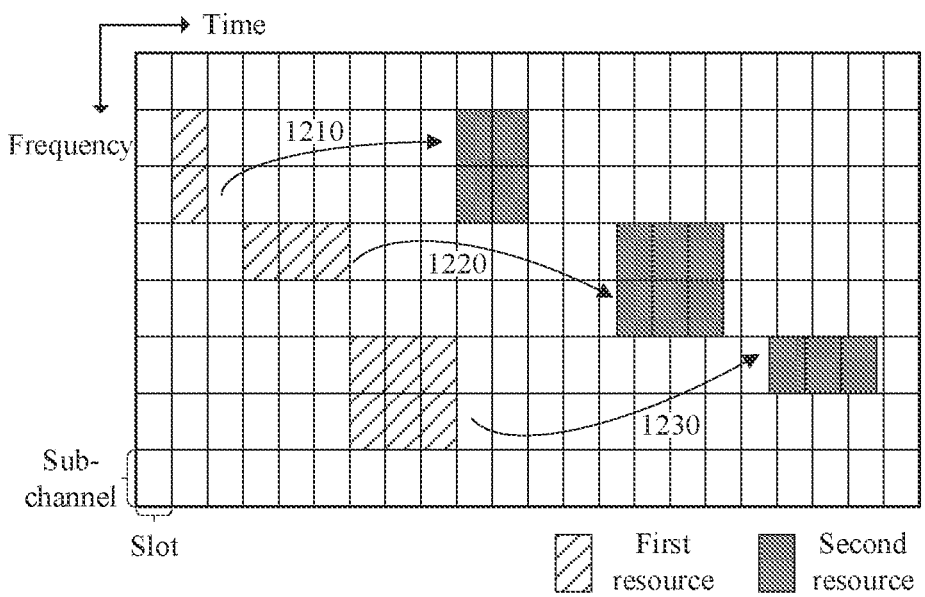
FIG. 12 is a schematic diagram of another association between a first resource and a second resource according to an embodiment of the present application.

For ease of understanding, taking an SL-U resource pool as an example, mapping relationships corresponding to equal division and unequal division of second resources in a resource pool are respectively described below with reference to FIG. 11 and FIG. 12. FIG. 11 is a schematic diagram of an association between a first resource and a second resource when the second resources are equally divided. FIG. 12 is a schematic diagram of an association between a first resource and a second resource when the second resources are not equally divided.

Referring to FIG. 11, in a time and frequency interleaved resource pool, each grid on the horizontal axis represents a slot, and each grid on the vertical axis represents a subchannel. Three terminal devices perform channel access in the resource pool. As shown in FIG. 11, in the resource pool, first resources are used as access resources for different terminal devices, and the sizes of the corresponding three resource blocks are different. Second resources are used as transmission resources for different terminal devices, and the sizes of the corresponding three resource blocks are the same. In other words, regardless of the service requirement of the terminal device or the size of the access resource, the terminal devices all obtain the transmission resources of the same size after the successful monitoring.

FIG. 11 describes different mapping relationships between the first resource and the second resource. A mapping relationship 1110 is for the full-slot channel access, a mapping relationship 1120 is for the half-slot channel access, and a mapping relationship 1130 is for the specified-position channel access.

FIG. 12 differs from FIG. 11 mainly in that the sizes of the resource blocks corresponding to the three second resources are different. In other words, the sizes of the transmission resources obtained by the three terminal devices after the successful channel monitoring are different. As shown in FIG. 12, the resource block for the second resource in a mapping relationship 1220 is the largest. A terminal device having a large service requirement may perform channel access on the first resource in the mapping relationship 1220.

It can be known from the foregoing description that when the terminal device performs channel access on the first resource of the shared spectrum, the subsequent transmission resource for the terminal device can be obtained based on the association relationship between the first resource and the second resource. In other words, as long as the terminal device successfully performs channel monitoring, the resource required for subsequent transmission can be ensured. Therefore, the terminal device does not need to perform resource selection, which avoids the situation that another RAT occupies the successfully detected channel during the resource selection.

The method embodiments of the present application are described in detail above with reference to FIG. 6 to FIG. 12. The apparatus embodiments of the present application are described in detail below with reference to FIG. 13 to FIG. 15. It should be understood that the description of the apparatus embodiments corresponds to the description of the method embodiments, and therefore, for parts that are not described in detail, reference may be made to the foregoing method embodiments.

Figure 13:
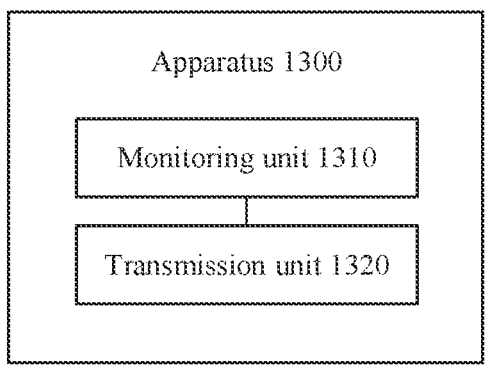
FIG. 13 is a schematic block diagram of a communication apparatus according to an embodiment of the present application.

FIG. 13 is a schematic block diagram of a communication apparatus according to an embodiment of the present application. The apparatus 1300 may be any terminal device described above. The apparatus 1300 shown in FIG. 13 includes a monitoring unit 1310 and a transmission unit 1320.

The monitoring unit 1310 may be configured to perform channel monitoring on shared spectrum.

The transmission unit 1320 may be configured to: if the result of the channel monitoring is that a channel is idle, start transmission of a first sidelink channel at a first time domain position. The first time domain position is one or more of the following: a time domain position indicated by first indication information; and a time domain position determined based on a first time unit, the first time unit being smaller than one slot.

Optionally, the first time unit includes one or more of the following: a half slot, one or more symbols, and one or more microseconds.

Optionally, the one or more microseconds are determined based on one or more of the following information: a specified time unit; and a duration of the channel monitoring.

Optionally, the one or more microseconds are a first value or an integer multiple of the first value, the first value being one of the following: 9 microseconds, 16 microseconds, and 25 microseconds.

Optionally, the first indication information is carried in control signaling.

Figure 14:
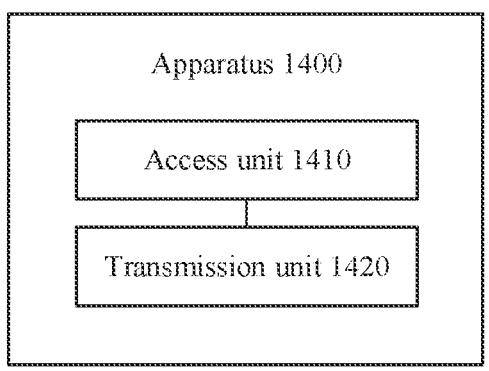
FIG. 14 is a schematic block diagram of another communication apparatus according to an embodiment of the present application.

FIG. 14 is a schematic block diagram of a communication apparatus according to another embodiment of the present application. The apparatus 1400 may be any terminal device described above. The apparatus 1400 shown in FIG. 14 includes an access unit 1410 and a transmission unit 1420.

The access unit 1410 may be configured to perform channel access on a first resource of shared spectrum, where the first resource is associated with a second resource in a resource pool.

The transmission unit 1420 may be configured to transmit a first sidelink channel on the second resource.

Optionally, an association relationship between the first resource and the second resource is determined based on one or more of the following information: first information for indicating a time domain position of the second resource; and second information for indicating a frequency domain position of the second resource.

Optionally, the first information includes one or more of the following information: a time domain start position of the second resource; a duration of the second resource; and an end time of the second resource.

Optionally, the time domain start position of the second resource is one of the following: a time domain start position of a first time unit; and a time domain start position indicated by indication information. The first time unit is one of the following: a slot, a half slot, one or more symbols, and one or more microseconds.

Optionally, the second information includes one or more of the following information: a frequency domain start position of the second resource; a frequency domain size of the second resource; and a frequency domain end position of the second resource.

Optionally, the first information is determined based on one or more of the following: a maximum value of an available time domain resource in the resource pool; the total number of second resources in time domain of the resource pool; the number of terminal devices; and the number of second resources corresponding to each terminal device in time domain.

Optionally, there are M terminal devices, and first information ConfigIndex corresponding to an $i^{th}$ terminal device in the M terminal devices satisfies:

$$\text{ConfigIndex} \in [T_{initial}^{i}, T_{initial}^{i} + P \times (T_{max}/K)],$$

where i is an integer of value 0 to M−1, $T_{initial}^{i}$ represents a time domain start position of a second resource corresponding to the $i^{th}$ terminal device, P represents the number of second resources corresponding to the $i^{th}$ terminal device in time domain, $T_{max}$ represents the maximum value of the available time domain resource in the resource pool, and K represents the total number of second resources in time domain of the resource pool.

Optionally, the second information is determined based on one or more of the following: the total number of second resources in frequency domain of the resource pool; the number of terminal devices; a maximum value of an available frequency domain resource in the resource pool; and the number of second resources corresponding to each terminal device in frequency domain.

Optionally, the terminal device includes M terminal devices, and second information FreqIndex corresponding to the $i^{th}$ terminal device in the M terminal devices satisfies:

$$\text{FreqIndex} \in [n\_SL\_PRB_i, n\_SL\_PRB_i + P \times (N_{max}/K)],$$

where i is the integer of value 0 to M−1, $n\_SL\_PRB_i$ represents a frequency domain start position of the second resource corresponding to the $i^{th}$ terminal device, P represents the number of second resources corresponding to the $i^{th}$ terminal device in frequency domain, $N_{max}$ represents the maximum value of the available frequency domain resource in the resource pool, and K represents the total number of second resources in frequency domain of the resource pool.

Figure 15:
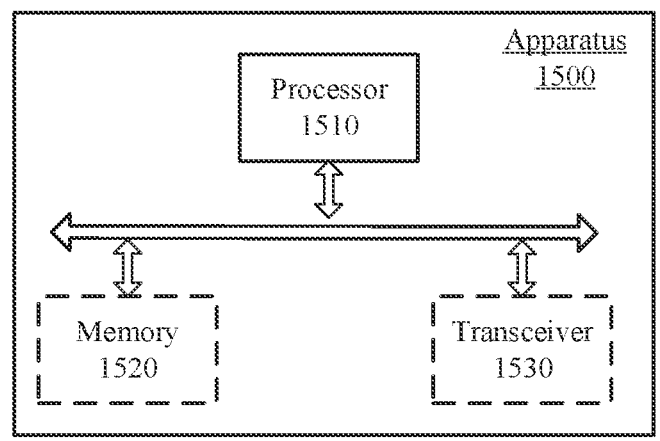
FIG. 15 is a schematic structural diagram of a communication apparatus according to an embodiment of the present application.

FIG. 15 is a schematic structural diagram of a communication apparatus according to an embodiment of the present application. The dashed line in FIG. 15 indicates that the unit or module is optional. The apparatus 1500 may be configured to implement the methods described in the foregoing method embodiments. The apparatus 1500 may be a chip or a terminal device.

The apparatus 1500 may include one or more processors 1510. The processor 1510 may allow the apparatus 1500 to implement the methods described in the foregoing method embodiments. The processor 1510 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, or a discrete hardware component. The general-purpose processor may be a microprocessor, or the processor may be any conventional processor or the like.

The apparatus 1500 may further include one or more memories 1520. The memory 1520 stores a program that can be executed by the processor 1510 to cause the processor 1510 to perform the methods described in the foregoing method embodiments. The memory 1520 may be independent of the processor 1510 or may be integrated in the processor 1510.

The apparatus 1500 may further include a transceiver 1530. The processor 1510 can communicate with another device or chip through the transceiver 1530. For example, the processor 1510 can send and receive data to and from another device or chip through the transceiver 1530.

An embodiment of the present application further provides a computer-readable storage medium for storing a program. The computer-readable storage medium can be applied to the terminal or the network device provided in the embodiments of the present application, and the program causes a computer to perform the methods to be performed by the terminal or the network device in various embodiments of the present application.

An embodiment of the present application further provides a computer program product. The computer program product includes a program. The computer program product can be applied to the terminal or the network device provided in the embodiments of the present application, and the program causes a computer to perform the methods to be performed by the terminal or the network device in various embodiments of the present application.

An embodiment of the present application further provides a computer program. The computer program can be applied to the terminal or the network device provided in the embodiments of the present application, and the computer program causes a computer to perform the methods to be performed by the terminal or the network device in various embodiments of the present application.

The terms "system" and "network" in the present application can be used interchangeably. In addition, the terms used in the present application are only used to explain the specific embodiments of the present application, and are not intended to limit the present application. It should be noted that the terms "first", "second", "third", "fourth", etc. in the specification, claims, and drawings of the present application are used to distinguish between different objects, rather than to describe a specific order. In addition, the terms "comprise" and "have" and any variations thereof are intended to cover a non-exclusive inclusion.

In the embodiments of the present application, "indicate" mentioned herein may refer to a direct indication, or may refer to an indirect indication, or may mean that there is an association relationship. For example, A indicates B, which may mean that A directly indicates B, for example, B can be obtained by means of A; or may mean that A indirectly indicates B, for example, A indicates C, and B can be obtained by means of C; or may mean that there is an association relationship between A and B.

In the embodiments of the present application, the term "corresponding" may mean that there is a direct or indirect correspondence between the two, or may mean that there is an association relationship between the two, which may also be a relationship such as indicating and being indicated, or configuring and being configured.

In the embodiments of the present application, "pre-defined" or "pre-configured" may be implemented by pre-storing corresponding codes, tables, or other forms that can be used to indicate related information in devices (for example, including the terminal device and the network device), and a specific implementation thereof is not limited in the present application. For example, pre-defined may refer to defined in the protocol.

In the embodiments of the present application, the "protocol" may refer to a standard protocol in the communications field, and may include, for example, an LTE protocol, an NR protocol, and a related protocol applied to a future communications system, which is not limited in the present application.

In the embodiments of the present application, determining B based on A does not mean determining B based only on A, but instead B may be determined based on A and/or other information.

In the embodiments of the present application, the term "and/or" is merely used to describe an association relationship between associated objects, indicating that there may be three relationships. For example, A and/or B may indicate that: only A exists, both A and B exist, and only B exists. In addition, the character "/" herein generally indicates an "or" relationship between the associated objects.

In the embodiments of the present application, sequence numbers of the foregoing processes do not mean execution sequences. The execution sequences of the processes should be determined according to functions and internal logic of the processes, and should not be construed as any limitation on the implementation processes of the embodiments of the present application.

In several embodiments provided in the present application, it should be understood that, the disclosed system, device, and method may be implemented in other manners. For example, the described device embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the devices or units may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of the embodiments.

In addition, function units in the embodiments of the present application may be integrated into one processing unit, or each of the units may exist alone physically, or two or more units are integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on the computer, the procedures or functions according to the embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center via a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A sidelink communication method, comprising:
   performing, by a terminal device, channel monitoring on shared spectrum; and
   when the terminal device determines that a result of the channel monitoring is that a channel is idle, determining, by the terminal device, a first time domain position to transmit a first sidelink signal over a first sidelink channel, wherein the first time domain position represents a starting time position of a first time unit in a time period, wherein the time period has two symbols, the time period is divided into a plurality of time units including the first time unit, wherein a duration of each of the plurality of time units is a first value or an integer multiple of the first value, the first value is 25 microseconds, and the first time domain position is determined based on one or more of the following information:

a specified time; or a time of the channel monitoring; and starting, by the terminal device, transmission of the first sidelink signal over the first sidelink channel at the first time domain position.

2. The method according to claim 1, wherein the specified time is indicated by a control signaling.

3. A sidelink communication apparatus, comprising:

at least one memory; and at least one processor coupled to the at least one memory and individually or collectively configured to perform operations comprising:

performing, by a terminal device, channel monitoring on shared spectrum;

when the terminal device determines that a result of the channel monitoring is that a channel is idle, determining, by the terminal device, a first time domain position to transmit a first sidelink signal over a first sidelink channel, wherein the first time domain position represents a starting time position of a first time unit in a time period, wherein the time period has two symbols, the time period is divided into a plurality of time units including the first time unit, wherein a duration of each of the plurality of time units is a first value or an integer multiple of the first value, the first value is 25 microseconds, and the first time domain position is determined based on one or more of the following information:

a specified time; or a time of the channel monitoring; and starting, by the terminal device, transmission of the first sidelink signal over the first sidelink channel at the first time domain position.

4. The apparatus according to claim 3, wherein the specified time is indicated by a control signaling.

5. One or more non-transitory computer-readable media storing computer instructions, that when executed by one or more processors, cause a computing device to perform operations comprising:

performing channel monitoring on shared spectrum; and when determining that a result of the channel monitoring is that a channel is idle, determining, a first time domain position to transmit a first sidelink signal over a first sidelink channel, wherein the first time domain position represents a starting time position of a first time unit in a time period, wherein the time period has two symbols, the time period is divided into a plurality of time units including the first time unit, wherein a duration of each of the plurality of time units is a first value or an integer multiple of the first value, the first value is 25 microseconds each of the plurality of time units is smaller than a symbol duration, and the first time domain position is determined based on one or more of the following information:

a specified time; or a time of the channel monitoring; and starting transmission of the first sidelink signal over the first sidelink channel at the first time domain position.

6. The one or more non-transitory computer-readable media according to claim 5, wherein the specified time is indicated by a control signaling.

* * * * *